Sept. 11, 1951 M. L. KAPLAN 2,567,713

LIGHT FILTER FOR BLACK AND WHITE AND COLOR TELEVISION RECEIVERS

Filed May 26, 1950

INVENTOR
Michael L. Kaplan
BY
Benjamin Sweedler
ATTORNEY

Patented Sept. 11, 1951 2,567,713

UNITED STATES PATENT OFFICE 2,567,713

LIGHT FILTER FOR BLACK AND WHITE AND COLOR TELEVISION RECEIVERS

Michael L. Kaplan, New Rochelle, N. Y., assignor, by mesne assignments, to Sightmaster Corp., New Rochelle, N. Y., a corporation of New York Application May 26, 1950, Serial No. 164,539

16 Claims. (Cl. 313—92)

This invention relates to light filters, and more particularly to light filters for television receivers.

One object of this invention is to provide a filter which transmits substantially equally all the colors of the spectrum in the visible light range and thus is particularly useful in color television because the filter transmits the various colors without substantial change in the value of the individual colors and without blocking any color.

Another object of this invention is to provide a light filter for a television receiver producing either a black and white or colored picture, which filter results in a picture more restful to the eyes and thus reduces eye strain on the part of the observers of the television receiver.

Still another object of this invention is to provide a filter for a television receiver which filter reduces glare and improves the clarity of the picture.

Still another object of this invention is to provide such filter, which, when the television receiver is not in use, functions as a mirror imparting an attractive ornamental appearance to the television receiver equipped with such filter.

Other objects and advantages of this invention will be apparent from the following detailed description thereof.

In accordance with this invention a filter is provided comprising a transparent surface, such as glass or transparent plastic, preferably glass, which surface has thereon a film of an alloy consisting essentially of from 10% to 30%, preferably about 20%, iron and from 70% to 90%, preferably about 80%, of a metal from the group: nickel, chromium, silver, aluminum, rhodium and mercury. The alloy film may be applied to a transparent supporting surface or may be applied to the surface of the screen of the cathode ray tube itself, thus providing the tube with an integral filter.

I have made the surprising and commercially important discovery that a transparent surface having the alloy film thereon of the composition hereinabove noted transmits all colors of the spectrum in the visible light range with substantially equal uniformity so that such filter is admirably suited for color television resulting in a colored picture of improved clarity in which the colors are sharply contrasting with little or no diminution of the contrast between the individual colors due to the use of the filter. Moreover, the filter reduces glare and otherwise minimizes eye strain. Furthermore, when used with a television receiver for black and white picture, the filter of this invention improves the clarity of the picture, imparts a pleasing tint thereto, reduces glare and minimizes possible eye strain incident to the viewing of such black and white picture.

In the accompanying drawing forming a part of this specification and showing, for purposes of exemplification, preferred forms of this invention without limiting the claimed invention to such illustrative instances, Figure 1 is a perspective view of a cabinet type television receiver embodying this invention, the cathode ray tube within the cabinet being shown in dotted lines;

Figure 1:
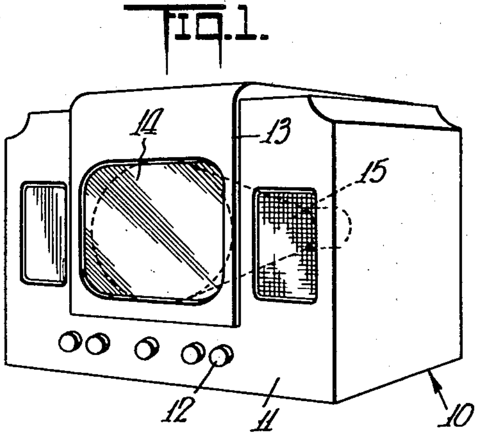

In the drawing 10 indicates a television receiving cabinet of any desired type having on its face 11 usual control knobs 12 and a frame 13 in which is suitably mounted a filter 14 consisting in the embodiment of the invention shown in Figure 1 of a pane of safety glass having on one surface thereof the alloy film hereinafter more fully described.

A cathode ray tube 15 having a fluorescent screen 16 (Figure 6) on the interior of the large end thereof is mounted in conventional manner within the cabinet 10. The fluorescent screen 16 is disposed on the inside of the glass face 17 forming the large end of the cathode ray tube as is conventional cathode ray tube practice. The screen end of the cathode ray tube is disposed just behind the filter 14, which filter is so dimensioned that it completely covers the entire area of the fluorescent screen 16. Filter 14 is disposed in a plane at right angles to the longitudinal axis of the cathode ray tube 15 close to and in front of the screen end of this tube.

Figure 2:
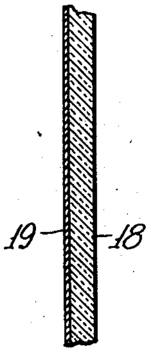
Figure 2 shows a vertical section through one form of filter embodying this invention.

Filter 14 in the embodiment of the invention shown in Figure 2 consists of a transparent surface 18 which may be a transparent plastic or glass, such as polished plate or sheet glass, desirably from ⅛" to ¼" thick, preferably about ¼″ thick in the case of plate glass and $\frac{3}{32}$″ in the case of sheet glass. Preferably, the glass is a heat tempered glass from ⅛″ to ¼″ thick, which when broken by being subjected to stress, such as the stresses generated by an exploding cathode ray tube, does not fly into small slivers and particles, but disintegrates without forming sharp fragments. This type of glass serves the same function as the well known safety glass and is known in the trade as "heat tempered glass." One example of such glass is that sold under the trade name "Tufflex." This type of glass will be hereinafter referred to as "heat tempered glass."

Formed on the face of the transparent surface 18, in the embodiment of the invention shown in Figure 2, is a semitransparent reflecting surface 19, which in the preferred embodiment consists of a film of an alloy containing from 10% to 30%, preferably about 20%, iron and from 70% to 90%, preferably about 80%, of a metal from the group consisting of nickel, mercury, chromium, silver, aluminum and rhodium. This invention, however, includes alloy films on a transparent supporting surface which films contain from 10% to 30%, preferably about 20% iron, and from 70% to 90%, preferably about 80%, of two or more metals from the aforesaid group, the two or more metals from this group being mixed in any desired proportions to produce a neutral grey film. The alloy may contain trace amounts of impurities present in the iron and the other metals with which the iron is alloyed. It will be understood therefore that the presence of small amounts of other materials in the alloy containing from 10% to 30% iron, and 70% to 90% of one or more of the other metals mentioned above comes within the scope of this invention. The preferred alloy consists essentially of about 20% iron and about 80% nickel.

The alloy film 19 is of a thickness of from $1 \times 10^{-6}$ to $100 \times 10^{-6}$ mm., preferably from $5 \times 10^{-6}$ to $30 \times 10^{-6}$ mm. It may be produced in any known manner. Preferably, the alloy film is formed on the transparent surface by evaporating the alloy metal under vacuum and causing the metal vapors thus produced to contact the surface on which the film is to be formed. The individual metals in the proper proportions to form the alloy may be thus evaporated to form a vapor mixture containing the desired proportions of individual metal vapors, or a preformed alloy may be evaporated to produce such vapor mixture. The amount of alloy metal thus deposited to form the transparent film 19 should be such as to form a film of the thickness hereinabove noted, and to produce a semitransparent reflecting surface, i. e., a surface which permits light rays to penetrate so that the picture is visible through the filter and when the television receiver is not in use, the alloy film in combination with the transparent surface on which it is disposed functions as a mirror. Desirably, a filter is thus produced having a density of from 20% to 50%, preferably about 35%. These values mean that the filter permits from 20% to 50%, preferably about 35%, of light in the visible range to pass therethrough and blocks out from 50% to 80%, preferably about 65%, of the light in the visible range.

Figure 3:
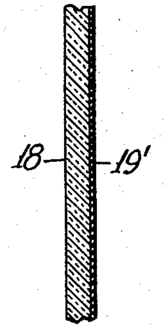
Figure 3 is a vertical section through a modified form of filter embodying this invention.

In the embodiment of the invention shown in Figure 3, the alloy film 19′ is formed on the back of the transparent surface 18, rather than on the front, as in the case of Figure 2. When using the filter of Figure 2 the transparent surface 18 is disposed close to and in front of the large end of the cathode ray tube 15 with the alloy film 19 forming the surface of the filter which is exposed. In the modification of Figure 3, the filter is positioned in front of the large end of the cathode ray tube at right angles to the longitudinal axis thereof with the alloy film 19′ contiguous to the fluorescent screen and of the tube and the transparent layer 18 exposed.

Figure 4:
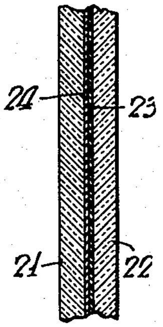
Figure 4 is a vertical section through still another modified form of filter embodying this invention.

In the modification of Figure 4 a safety glass of laminated construction is employed consisting of two layers 21, 22 inseparably bonded by an intervening layer 23 of transparent plastic material, such as cellulose nitrate, cellulose acetate, or a polyvinyl resin, preferably polyvinyl butyral. One of the layers, in the embodiment of the invention shown in Figure 4, layer 21, is provided with a semitransparent reflecting alloy film 24. In this embodiment of the invention film 24 is disposed contiguous to the layer 23 of transparent plastic material so that it is hermetically sealed by the plastic layer 23 between the glass layers 21 and 22. The alloy film, if desired, may be placed on the back or face of layer 22, or on the face of layer 21. It is preferred, however, to position this alloy film on the surface of layer 21 or 22, which contacts the layer of plastic bonding material 23 so that the alloy film is hermetically sealed between the glass layers 21 and 22.

Figures 5, 6:
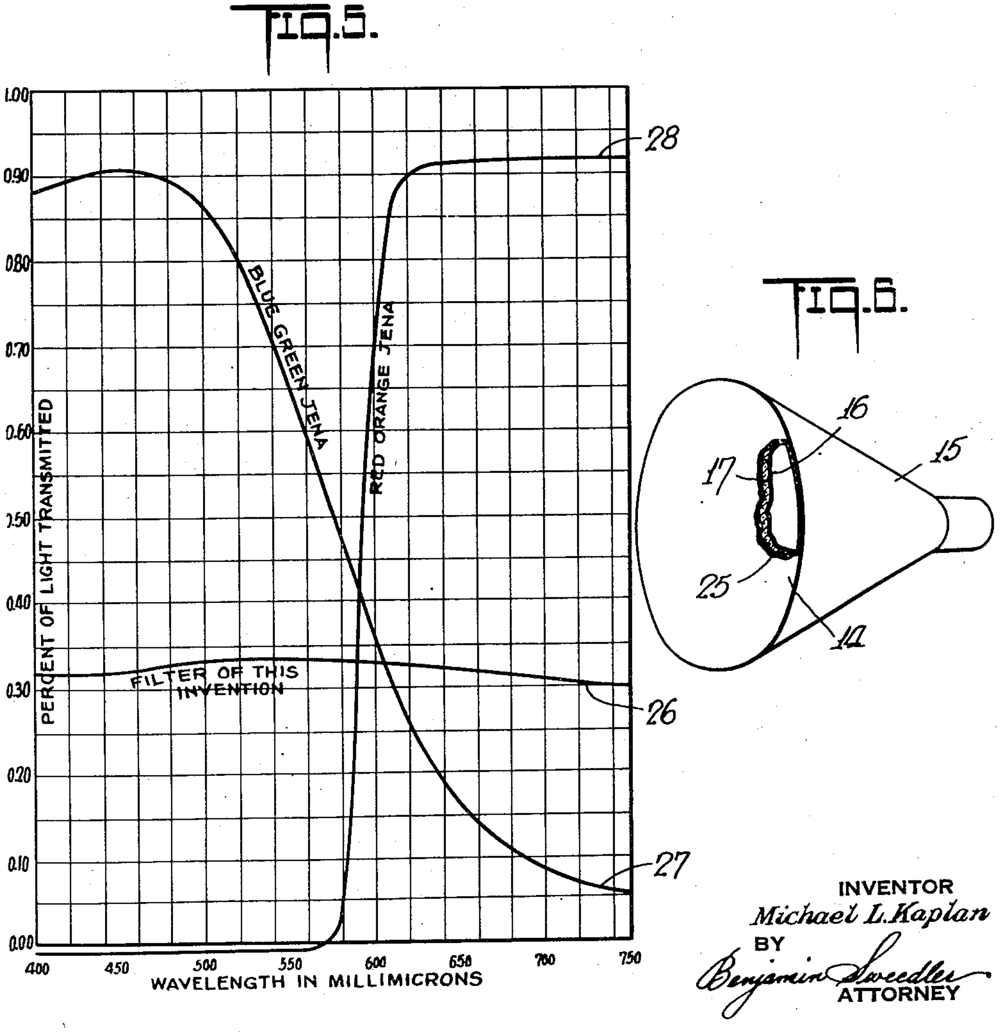
Figure 5 shows graphically the results of comparative spectrophotometric tests of (1) the filter of this invention, (2) a red-orange Jena filter and (3) a blue-green Jena filter.
Figure 6 is a perspective view of a cathode ray tube embodying this invention.

Figure 6 shows a cathode ray tube having an alloy film 25 of the composition and thickness hereinabove described produced directly on the outside of the glass face 17 on the inside of which is deposited the fluorescent screen 16. Thus, the cathode ray tube, which may be of the all glass type or the type formed of a metal conical portion provided with an outer glass face on the inside of which the fluorescent screen is produced, has the filter integrally formed therewith. Instead of having the alloy film on the outside face of th cathode ray tube, this film may be formed on the inside of glass face 17.

The filter of this invention not only functions to protect the viewer of the television receiver from possible injury due to explosion of the cathode ray tube, but (*a*) reduces glare, (*b*) minimizes eye strain, (*c*) imparts a pleasing tinted cast to the picture, (*d*) when the television receiver is not in use functions as a mirror thus resulting in a receiver which has an unusually attractive ornamental appearance, and (*e*) improves the clarity of both black and white and colored pictures. Another important advantage of the filter of this invention is that it is not detrimentally affected by the color of the cathode ray tube. The filter 14 substantially uniformly transmits a given percentage of the light in the visible range, irrespective of its wave length; the percentage transmitted depends on the density of the filter.

In the case of colored pictures this improvement in clarity is due to the surprising properties of the filter of this invention; namely, it substantially uniformly transmits all of the individual colors forming the spectrum in the visible light range. That this is the case is demonstrated by standard spectrophotometric comparative tests to which the filter of this invention and two comparative known filters were subjected. The results of these tests are shown in Figure 5. In this figure the curve identified by the reference character 26 shows the percentage of different wave lengths of light in the range from 400 to 750 millimicrons transmitted by the filter of this invention consisting of a polished plate glass layer ¼" thick having thereon a film of nickel and iron consisting of about 20% iron and 80% nickel.

Curve 27 shows the performance of a conventional blue-green Jena filter approximately 1.94 millimeters thick.

Curve 28 shows the performance of a conventional red-orange Jena filter approximately 1.85 millimeters thick.

The contrast between the filter of this invention and the other two filters, from the standpoint of their properties to transmit uniformly the different individual colors of the spectrum in the visible light range is indeed striking. Note the curve of this invention is substantially flat throughout the range of wave lengths of light tested, proving that the filter of this invention transmits all colors of the spectrum in the visible light range substantially uniformly, whereas the comparative filters subjected to test show a marked variation in their transmission properties of light having wave lengths of from 500 to 650 millimicrons (blue-green Jena filter) and from 550 to 625 millimicrons (red-orange Jena filter). As a practical matter a filter which does not show a variation in excess of 5% in its property to transmit light of different wave lengths in the range of from 400 to 750 millimicrons is eminently satisfactory for color television. The filter of this invention it will be noted from curve 26 of Figure 5 shows a variation of less than 5%. It is therefore evident that the filter of this invention substantially uniformly transmits the individual colors forming the spectrum in the visible light range and is therefore an eminently satisfactory color television filter.

This filter functions to blank out from the television screen the major portion of the light emanating from sources of illumination exterior of the television set in the locality in which the set is disposed. Thus, filters having a density of from 20% to 50% blank out from 50% to 80% of such extraneous light, eliminating glare which would otherwise be caused by the reflection of this light. The clarity of a black and white picture is due to the contrast values between the black and white portions of the fluorescent screen. For example, in normal television practice this contrast value may be 30 to 3 between black and white, or a contrast ratio of 10 to 1. In a lighted room, assuming that 9 lamberts of light are reflected on to the picture, these 9 lamberts must be added to each value. 30 to 3 now becomes 39 to 12, or a contrast ratio of 3¼ to 1, instead of 10 to 1. With the filter of this invention assuming it has a density of 66⅔%, ⅔ of the room light would be blocked out. Thus in the above example only 3 lamberts would be reflected on to the picture on the cathode ray tube making the value 33 to 6, or a ratio of 5½ to 1. Hence, the clarity of the picture is improved twofold. While the filter also blocks out light emanating from the television screen this is not objectionable as long as the different wave lengths of light in the visible range are transmitted substantially uniformly. When this takes place the contrast ratio remains unchanged. The operating voltage of most television receivers is in the range of 6,000 to 20,000 volts, the average is about 11,000 volts. There is therefore a large excess of light generated and even when as much as 80% of this light is blocked out, the clarity of the picture is not materially affected provided the contrast ratio is not altered materially. As above noted, a most important feature of the filter of this invention is that it does not result in an appreciable alteration of the contrast ratio.

Since different embodiments of this invention can be made without departing from the scope thereof, it is intended that all matter in the above description or shown in the accompanying drawing shall be interpreted as illustrative and not in a limiting sense. Thus, while the invention has been described above in connection with its use in the television receiver field, it can be used in other fields involving the substantial uniform transmission of light of different wave lengths, e. g., as a windshield for automobiles and other vehicles and in the visor field.

What is claimed is:

1. A light filter comprising a transparent supporting surface having thereon an alloy film consisting essentially of from 10% to 30% iron and from 70% to 90% of a material from the group consisting of nickel, mercury, chromium, silver, aluminum, rhodium and a mixture of at least two of said metals nickel, mercury, chromium, silver, aluminum and rhodium.

2. A light filter as defined in claim 1, having a density of from 50% to 80%.

3. A light filter as defined in claim 1, having an alloy film of a thickness of $1 \times 10^{-6}$ to $100 \times 10^{-6}$ mm.

4. A light filter comprising a transparent supporting surface having thereon an alloy film consisting essentially of about 20% iron and about 80% of a metal from the group consisting of nickel, mercury, chromium, silver, aluminum and rhodium.

5. A light filter comprising a transparent supporting surface having thereon an alloy film consisting essentially of about 20% iron and about 80% nickel.

6. A light filter constituted of a layer of heat tempered glass having on one side thereof an alloy film consisting essentially of from 10% to 30% iron and from 70% to 90% of a material from the group consisting of nickel, mercury, chromium, silver, aluminum and rhodium and a mixture of at least two of said metals nickel, mercury, chromium, silver, aluminum and rhodium.

7. A light filter constituted of a layer of heat tempered glass having on one side thereof an alloy film consisting essentially of about 20% iron and about 80% of a metal from the group consisting of nickel, mercury, chromium, silver, aluminum and rhodium.

8. A light filter constituted of a layer of heat tempered glass having thereon an alloy film consisting essentially of about 20% iron and 80% nickel.

9. A light filter comprising two layers of plate glass inseparably bonded, one of said layers having thereon an alloy film consisting essentially of from about 10% to 30% iron and from about 70% to 90% of a metal from the group consisting of nickel, mercury, chromium, silver, aluminum and rhodium.

10. A cathode ray tube having a fluorescent screen at the inside of the large end thereof and having on the outside of said large end an alloy film consisting essentially of from 10% to 30% iron and from 70% to 90% of a metal from the group consisting of nickel, mercury, chromium, silver, aluminum and rhodium.

11. A cathode ray tube having a fluorescent screen at the inside of the large end thereof and having on the outside of said large end an alloy film consisting essentially of about 20% iron and about 80% of a metal from the group consisting of nickel, mercury, chromium, silver, aluminum and rhodium.

12. A cathode ray tube having a fluorescent screen at the inside of the large end thereof and having on the outside of said large end an alloy film consisting essentially of about 20% iron and about 80% nickel.

13. In a television receiver, in combination, a cathode ray tube having a fluorescent screen on the large end thereof, a visually transparent protective member and a semitransparent metallic reflecting surface on said member, said reflecting surface consisting of an alloy film constituted of from 10% to 30% iron and from 70% to 90% of a metal from the group consisting of nickel, mercury, chromium, silver, aluminum and rhodium.

14. In a television receiver, in combination, a cathode ray tube having a fluorescent screen on the large end thereof, a visually transparent protective member and a semitransparent metallic reflecting surface on said member, said reflecting surface consisting of an alloy film constituted of about 20% iron and about 80% of a metal from the group consisting of nickel, mercury, chromium, silver, aluminum and rhodium.

15. In a television receiver, in combination, a cathode ray tube having a fluorescent screen on the large end thereof, a visually transparent protective member and a semitransparent metallic reflecting surface on said member, said reflecting surface consisting of an alloy film constituted of about 20% iron and about 80% nickel.

16. A cathode ray tube having a fluorescent screen at the inside of the large end thereof and also having on the large end thereof an alloy film consisting essentially of from 10% to 30% iron and from 70% to 90% of a metal from the group consisting of nickel, mercury, chromium, silver, aluminum and rhodium.

MICHAEL L. KAPLAN.

REFERENCES CITED

The following references are of record in the file of this patent:

UNITED STATES PATENTS

| Number | Name | Date |
|---|---|---|
| 1,176,313 | Pfund | Mar. 21, 1916 |
| 1,222,049 | Tillyer | Apr. 10, 1917 |
| 2,090,922 | Von Ardenne | Aug. 24, 1937 |
| 2,312,206 | Calbick | Feb. 23, 1943 |
| 2,346,810 | Young | Apr. 18, 1944 |
| 2,409,356 | Hutchings | Oct. 15, 1946 |
| 2,461,464 | Aronstein | Feb. 8, 1949 |
| 2,476,619 | Nicoll | July 19, 1949 |
| 2,485,561 | Burroughs | Oct. 25, 1949 |
| 2,494,992 | Ferguson | Jan. 17, 1950 |